US012611003B2

(12) United States Patent
Kajiwara et al.

(10) Patent No.: US 12,611,003 B2
(45) Date of Patent: Apr. 28, 2026

(54) SOLE SERIES AND METHOD FOR MANUFACTURING SOLE

(71) Applicant: MIZUNO CORPORATION, Osaka (JP)

(72) Inventors: Yo Kajiwara, Osaka (JP); Shunsuke Tazawa, Osaka (JP)

(73) Assignee: MIZUNO CORPORATION, Osaka (JP)

( * ) Notice: Subject to any disclaimer, the term of this patent is extended or adjusted under 35 U.S.C. 154(b) by 0 days.

(21) Appl. No.: 18/914,329

(22) Filed: Oct. 14, 2024

(65) Prior Publication Data

US 2025/0127261 A1       Apr. 24, 2025

(30) Foreign Application Priority Data

Oct. 20, 2023      (JP) ................................. 2023-180896

(51) Int. Cl.
*A43B 13/02*      (2022.01)
*A43B 13/18*      (2006.01)
*B33Y 10/00*      (2015.01)

(52) U.S. Cl.
CPC ............ *A43B 13/023* (2013.01); *A43B 13/18* (2013.01); *B33Y 10/00* (2014.12)

(58) Field of Classification Search
CPC ........ A43B 13/023; A43B 13/12; A43B 13/18
USPC ......................................................... 36/25 R
See application file for complete search history.

(56) References Cited

U.S. PATENT DOCUMENTS

| | | | |
|---|---|---|---|
| 2009/0320330 A1* | 12/2009 | Borel | A43B 13/14 36/30 R |
| 2018/0132559 A1* | 5/2018 | Jacobsen | B32B 37/04 |
| 2020/0305543 A1 | 10/2020 | Kajiwara et al. | |
| 2022/0378150 A1* | 12/2022 | Brooks | A43B 13/206 |
| 2023/0105107 A1* | 4/2023 | Cavaliere | A43B 13/12 36/28 |
| 2023/0200486 A1 | 6/2023 | Kajiwara | |
| 2023/0320457 A1* | 10/2023 | Hurt | A43B 13/125 36/25 R |

FOREIGN PATENT DOCUMENTS

| | | |
|---|---|---|
| JP | 3106921 U | 1/2005 |
| JP | 2020-163084 A | 10/2020 |
| JP | 2023-096397 A | 7/2023 |

OTHER PUBLICATIONS

Office Action mailed Sep. 9, 2025, in corresponding Japanese Application No. 2023-180896 and its machine translation.

* cited by examiner

*Primary Examiner* — Timothy K Trieu
(74) *Attorney, Agent, or Firm* — Renner, Otto, Boisselle & Sklar, LLP

(57)           ABSTRACT
Each of midsoles of a plurality of types of soles that constitute a sole series includes an upper midsole and a corresponding one of lower midsoles. Each of the plurality of types of soles is configured such that, in a non-wearing state, while the sole contacts ground at an intersection, a heel region does not contact the ground. While the upper midsoles of the plurality of types of soles are formed to have the same shape, the lower midsoles of the plurality of types of soles are formed to have different shapes such that an angle between a straight line and the ground is a forwardly descending angle that differs between the soles.

5 Claims, 9 Drawing Sheets

1

SOLE SERIES AND METHOD FOR MANUFACTURING SOLE

CROSS-REFERENCE TO RELATED APPLICATION

This application claims priority to Japanese Patent Application No. 2023-180896 filed on Oct. 20, 2023, the entire disclosure of which is incorporated by reference herein.

BACKGROUND

The present disclosure relates to a sole series and a method for manufacturing a sole.

There are different running styles with different impacting patterns, that is, a forefoot running style, a midfoot running style, and a heel strike running style. In recent years, the forefoot running style or the midfoot running style is considered effective for efficiently running fast.

However, the forefoot running style and the midfoot running style are not easy running style for everyone to perform. In addition, there is also a concern that these types of running styles accelerate muscle fatigue around a calf, and therefore, in middle-to-long-distance running, it is not easy to keep the forefoot running style or the midfoot running styles until a final stage.

Therefore, in recent years, various shoes that include a sole that encourages running in the forefoot running style or the midfoot running style and thus facilitate efficient and fast running have been proposed (for example, see Japanese Unexamined Patent Publication No. 2020-163084 below).

Japanese Unexamined Patent Publication No. 2020-163084 discloses a shoe including a sole configured such that a thickness of a region of the sole around a middle in a longitudinal direction of the sole is larger than those of a heel region and a toe region of the sole and a lower surface of a hindfoot is inclined upward toward rear. According to the shoe, while a forefoot or a midfoot easily contacts ground when impacting the ground, it is difficult for the heel region to contact the ground, so that it is possible to encourage a wearer to perform running in the forefoot running style or the midfoot running style.

Incidentally, an angle of a foot when impacting the ground varies from person to person, and around what degree the angle of the foot is urged to be by a sole in order to enable a person to run faster more efficiently also varies from person to person. Therefore, a plurality of types of soles are preferably prepared for efficiently running fast.

In addition, a sole of a shoe used for efficiently running fast needs to be easily elastically deformed and have a high bending rigidity and a light weight. Specifically, a midsole is required to have a low hardness, a high repulsiveness, and a light weight.

However, in order to form a midsole with a low hardness, a high repulsiveness, and a light weight, it is necessary to use an expensive mold. Therefore, as described above, many expensive molds need to be prepared in order to prepare a plurality of types of soles (provide a wide variety of soles), and this leads large increase in initial investment cost and thus it is not easy to provide a wide variety of soles.

In view of the foregoing, the present disclosure has been devised and it is therefore an object of the present disclosure to reduce an initial investment cost in manufacturing a sole series including a plurality of types of soles.

SUMMARY

To achieve the object described above, according to a first aspect of the present disclosure, provided is a sole series that includes a plurality of types of soles each including a midsole that extends from a heel region to a toe region and has an upper surface that serves as a sole supporting surface that supports a sole of a shoe wearer, and each of the midsoles of the plurality of types of soles includes an upper midsole that extends from the heel region to the toe region and is formed of an elastic material, a lower midsole having an upper surface that extends along a lower surface of the upper midsole, extends from the heel region to the toe region, and is formed of an elastic material, and in each of the soles, when a position of a rearmost end on the sole supporting surface is P0, a position of a foremost end on the sole supporting surface is P100, a straight line connecting the position P0 and the position P100 is Ls, a curved line connecting the position P0 and the position P100 and extending along the sole supporting surface is Lc, a length of a curved line Lc is L, a position at a distance of 0.15 L from the position P0 on the curved line Lc is P15, a position at a distance of 0.45 L from the position P0 on the curved line Lc is P45, a position at a distance of 0.68 L from the position P0 on the curved line Lc is P68, an intersection of the straight line orthogonal to the straight line Ls passing through the position P45 and a lower surface is C, and a straight line connecting the position 15 and the position P68 is T, each of the plurality of types of soles is configured such that, in a non-wearing state, while the sole contacts ground at the intersection C, the heel region does not contact the ground, the upper midsoles of the plurality of types of soles are formed to have a same shape, and the lower midsoles of the plurality of types of soles are formed to have different shapes such that an angle between the straight line T and the ground is a forwardly descending angle that differs between the plurality of types of soles.

The sole series of the first aspect includes a plurality of types of soles and each of the plurality of types of soles is configured such that, in the non-wearing state, while the sole contacts the ground at a position (the intersection C) corresponding to a plantar arch of a foot of the wearer, the heel region does not contact the ground, and furthermore, is configured such that an inclination angle (an angle between the straight line T and the ground) of the foot supporting surface is a forwardly descending angle. With the configuration described above, in each of the plurality of types of soles that constitute the sole series, while it is difficult for the heel region to contact the ground, a forefoot or a midfoot easily contacts the ground. That is, according to the sole series of the first aspect, the plurality of types of soles that can encourage the wearer to perform running in the forefoot running style or the midfoot running style can be provided.

In the first aspect, each of the midsoles is formed into an upper and lower double layer structure and, while the upper midsoles having the same shape are used (only one model is prepared) for the plurality of types of soles, the lower midsoles having different shapes are used (a plurality of models are prepared) for the plurality of types of soles. Thus, the plurality of types of soles configured such that the inclination angle of the sole supporting surface (the angle between the straight line T and the ground) differs between the plurality of types of soles are provided. According to the configuration described above, in manufacturing the plurality of types of soles, the number of types of molds that are to be prepared for forming the midsoles can be reduced. Therefore, according to the first aspect, in manufacturing the sole series including the plurality of types of soles that can encourage the wearer to perform running in the forefoot running style or the midfoot running style, an initial investment cost can be reduced.

According to a second aspect, in the sole series of the first aspect, in each of the soles, when an intersection of the straight line orthogonal to the straight line Ls passing through the position P45 and the lower surface of the upper midsole is P45', an intersection of a straight line orthogonal to the straight line Ls passing through the position P68 and the lower surface of the upper midsole is P68', and a straight line connecting the position P45' and the position P68' is T', the lower midsoles of the plurality of types of soles are formed such that an angle between the straight line T' and the ground is a forwardly descending angle that differs between the plurality of types of soles.

In the second aspect, each of the plurality of types of soles is configured such that an angle of a boundary surface between the upper midsole and the lower midsole (an angle between the straight line T' and the ground) in a midfoot region is a forwardly descending angle in the non-wearing state. With the configuration described above, each of the plurality of types of soles that constitute the sole series encourages shifting of center of gravity of the wearer forward after contacting the ground. That is, according to the sole series of the second aspect, the plurality of types of soles that can cause the wearer to smoothly perform running in the forefoot running style or the midfoot running style can be provided.

In the second embodiment, the shapes of the lower midsoles are made different from each other, so that the plurality of types of soles configured such that the angle of the boundary surface between the upper midsole and the lower midsole (the angle between the straight line T' and the ground) in the midfoot region differs between the plurality of types of soles are provided. According to the configuration described above, a wide variety of soles with different feelings at stepping after contacting the ground can be provided.

According to a third aspect, in the first aspect, at least one of the lower midsoles of the plurality of types of soles is a long lower midsole configured such that a front end thereof is disposed more forward than a front end of the upper midsole and an upper surface of a front end portion disposed more forward than the front end of the upper midsole forms a front end portion of the sole supporting surface.

In the third aspect, at least one of the lower midsoles of the plurality of types of soles is formed as a long lower midsole configured such that the front end thereof is disposed more forward than the front end of the upper midsole. According to the configuration described above, while using the upper midsoles having the same shape, as the lower midsoles, the lower midsole configured such that the front end thereof is not disposed more forward than the front end of the upper midsole and the long lower midsole are used, so that soles of different sizes can be provided. That is, in the third aspect, while the upper midsoles having the same shape are used, different types of lower midsoles are used, so that the soles configured such that not only the inclination angle of the sole supporting surface (the angle between the straight line T and the ground) differs between the soles but also the size differs between the soles can be provided. Therefore, according to the third aspect, in manufacturing the sole series including the plurality of types of soles that can encourage the wearer to perform running in the forefoot running style or the midfoot running style, the initial investment cost can be further reduced.

According to a fourth aspect, in the third aspect, the long lower midsole is configured such that when a position at a distance of 0.90 L from the position P0 on the curved line Lc is P90, the position P90 is located on the upper surface of the upper midsole.

In the fourth aspect, on the sole supporting surface (upper surface) of the sole, the long lower midsole is configured such that a boundary between the upper midsole and the long lower midsole is located more forward than the position P90. Normally, the foot of the wearer is placed on a region located in a rear side from the position P90 on the sole supporting surface of the sole, and the foot of the wearer is not placed in a region from the position P90 to the foremost position 100 on the sole supporting surface. Therefore, by configuring the soles in the manner described above, in the wearing state, the foot of the wearer is not placed on the boundary between the upper midsole and the long lower midsole and the wearer does not have an uncomfortable feeling.

According to a fifth aspect, in the second aspect, each of the plurality of types of soles includes a plate that is provided between the upper midsole and the lower midsole and is formed of an elastic material having a higher hardness than that of the upper midsole, and the plates of the plurality of types of soles are formed to have a same shape.

In the fifth aspect, the upper midsoles having the same shape are used for the plurality of types of soles, and therefore, the plates having the same shape can be used. Thus, in manufacturing the sole series including the plurality of types of soles that can encourage the wearer to perform running in the forefoot running style or the midfoot running style, the initial investment cost can be further reduced.

According to a sixth aspect, provided is a method for manufacturing a sole including a midsole that extends from a heel region to a toe region and has an upper surface that serves as a sole supporting surface that supports a sole of a shoe wearer, the sole is one of the soles that constitutes the sole series of the first aspect, and the method incudes a selecting step of selecting one lower midsole from a plurality of types of lower midsoles with different shapes.

According to the sixth aspect, in manufacturing the sole series including the plurality of types of soles, the initial investment cost can be reduced.

Advantages of the Invention

As has been described above, according to the present disclosure, in manufacturing a sole series including a plurality of types of soles, an initial investment cost can be reduced.

DETAILED DESCRIPTION

Embodiments of the present disclosure will be described below in detail with reference to the accompanying drawings. The following embodiments are mere examples by nature, and are not intended to limit the scope of applications or uses of the present disclosure.

First Embodiment

Figure 5:
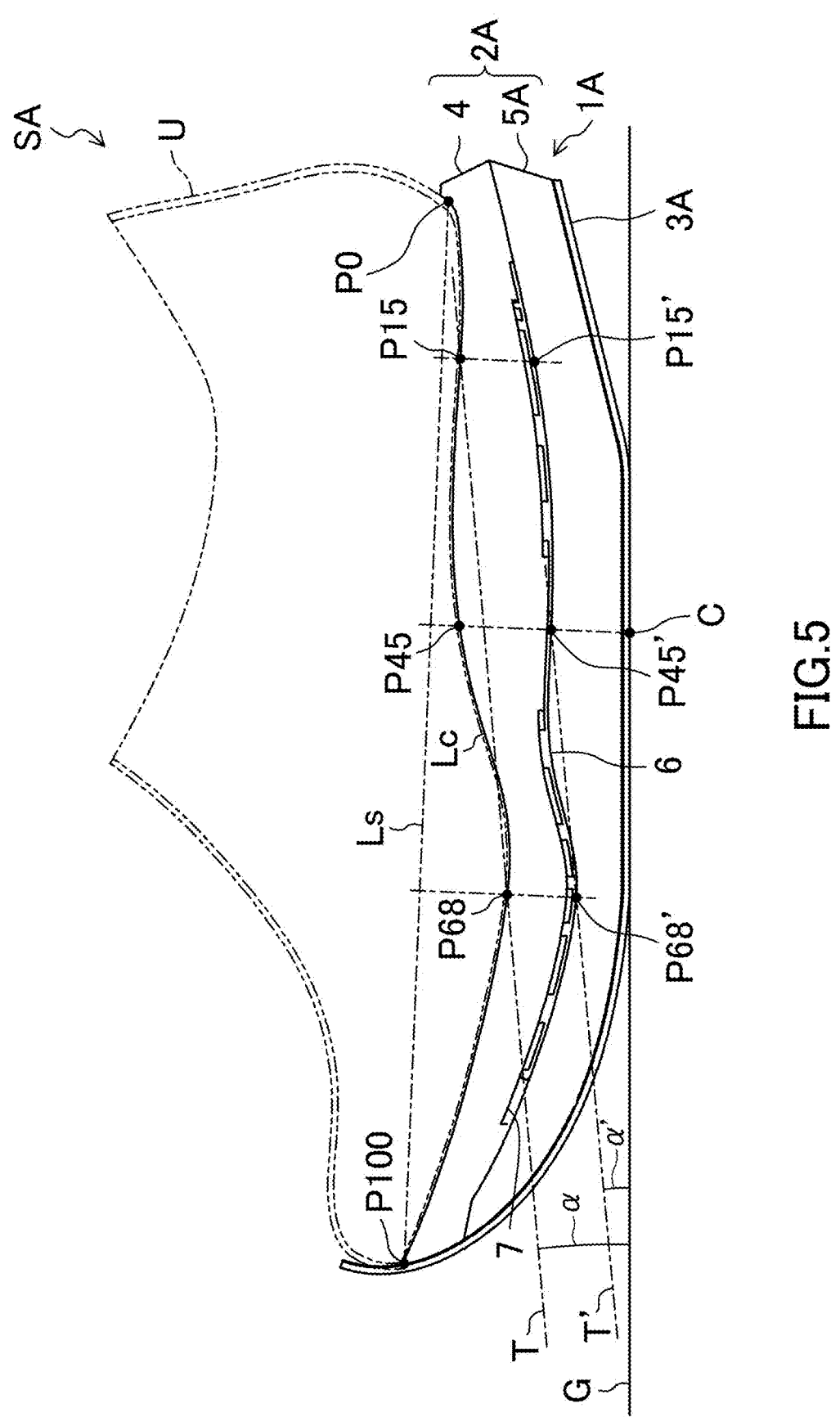
FIG. 5 is a cross-sectional view of the sole 1A of FIG. 1 when viewed from a lateral side.
Figure 6:
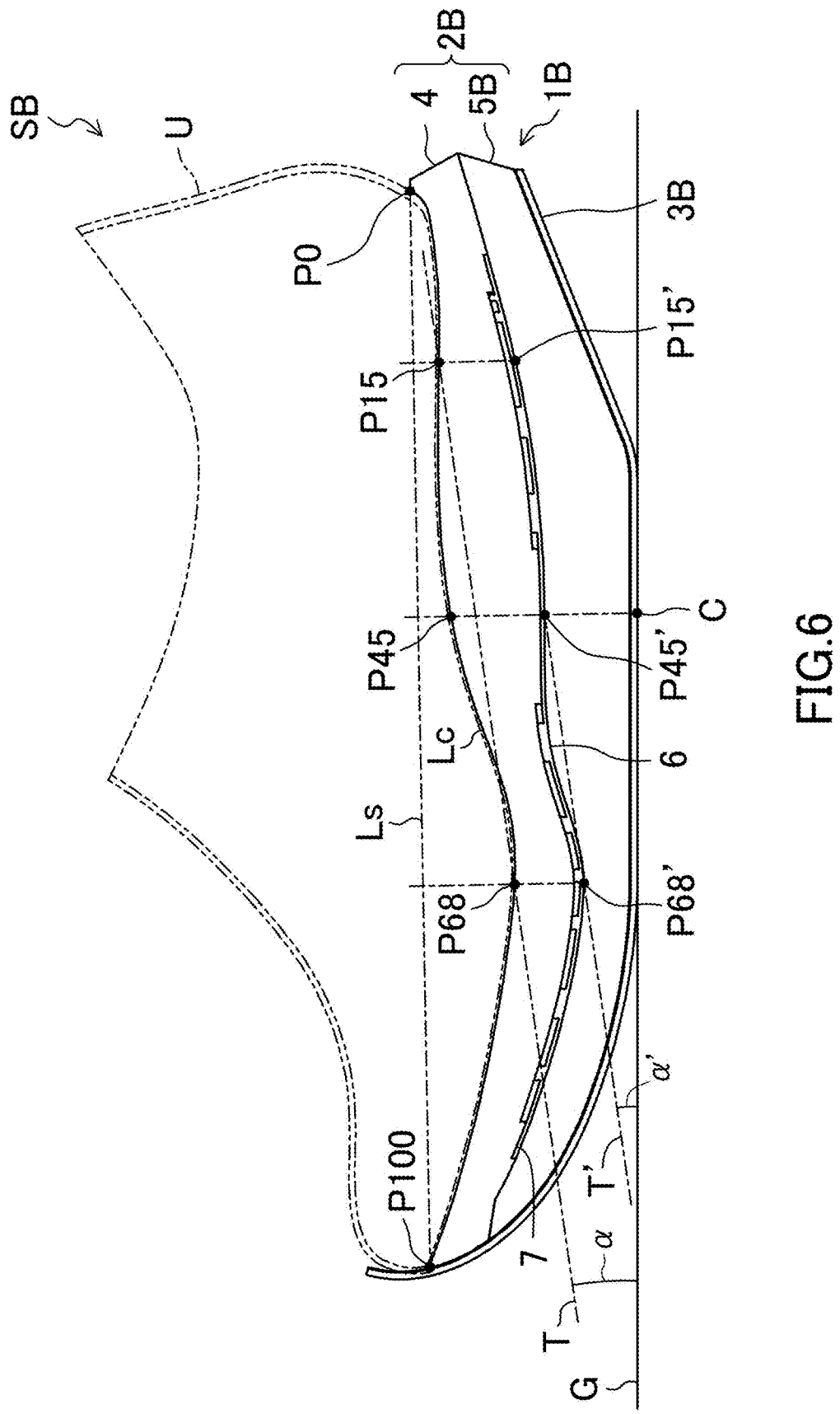
FIG. 6 is a cross-sectional view of the sole 1B of FIG. 1 when viewed from the lateral side.
Figure 7:
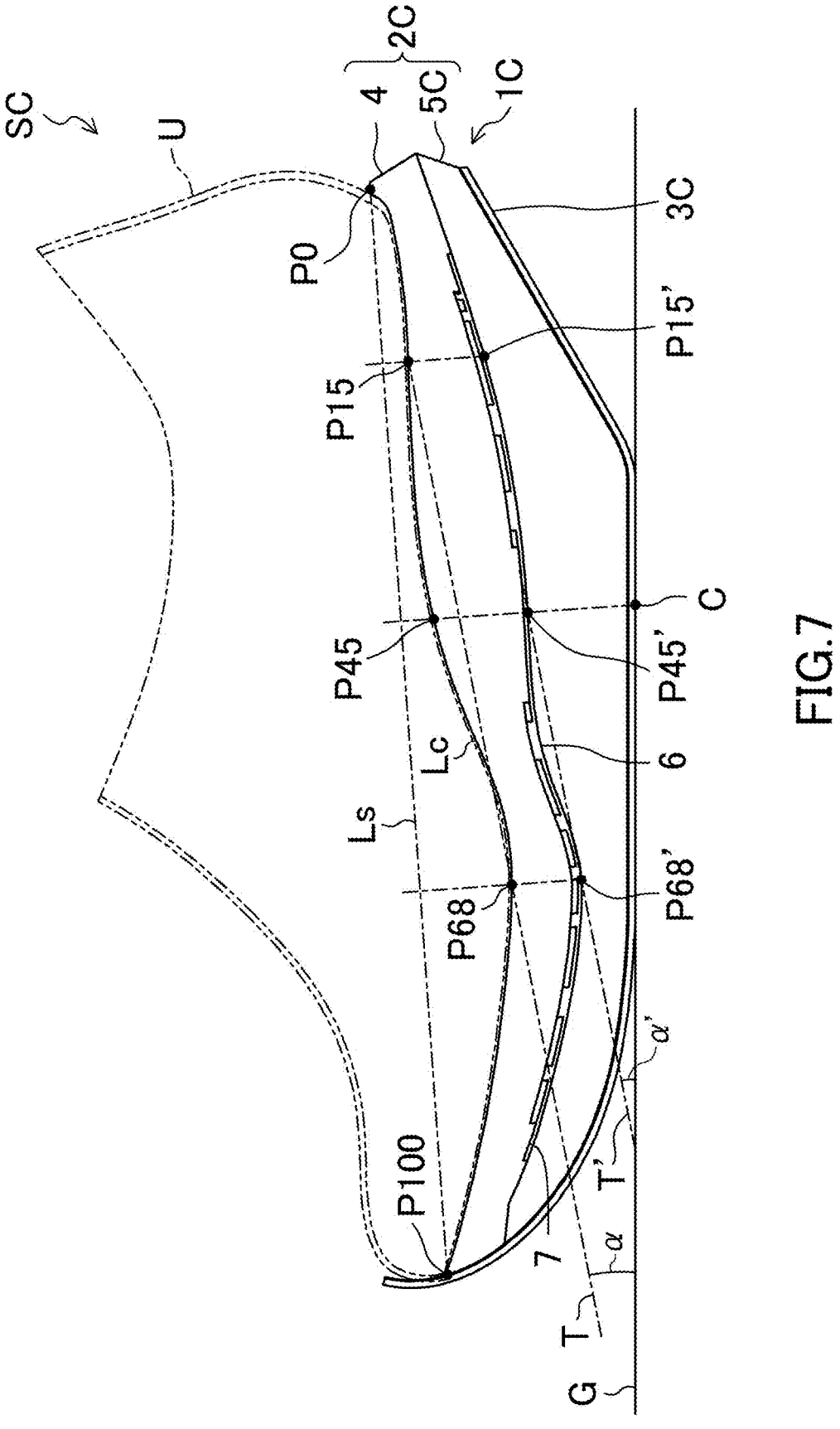
FIG. 7 is a cross-sectional view of the sole 1C of FIG. 1 when viewed from the lateral side.

FIG. 1 to FIG. 7 are views illustrating a configuration of a sole series S according to a first embodiment of the present disclosure and each illustrates only respective left foot parts of all of or a left foot part of a corresponding one of three types of soles 1A to 1C that constitutes the sole series S. Note that FIG. 5 to FIG. 7 are cross-sectional views of the left foot parts of the soles 1A to 1C when viewed from a lateral side and hatching is omitted for convenience. The soles 1A to 1C are applicable to athletic shoes that are worn by athletes of various sports. Herein, an example where the soles 1A to 1C are applied to shores SA to SC for use in middle-to-long-distance running will be described.

Each pair of the shoes SA to SC is formed of a corresponding one of the left foot parts illustrated in FIG. 5 to FIG. 7 and a right foot part (not illustrated) that is bilaterally symmetrical with the left foot part. Each of the shoes SA to SC includes a corresponding one of the soles 1A to 1C and an upper (instep portion) U fixed thereon by adhesion or sewing. For the upper U, only an outer shape is indicated by a two-dot chain line in each of FIG. 5 to FIG. 7. However, the upper U may be in any form as long as the upper U can cover an instep of a shoe wearer. In the first embodiment, the respective uppers U of the shoes SA to SC are formed to have the same shape.

Note that, in the following description, for the soles 1A to 1C of the sole series S, only the left foot parts illustrated in FIG. 5 to FIG. 7 will be described and description of the right foot parts will be omitted.

In the following description, the expressions "upward (upper side)" and "downward (lower side)" represent a positional relationship in each of the soles 1A to 1C in a vertical direction. The expressions "front (fore)" and "rear (hind)" represent a positional relationship in each of the soles 1A to 1C in a foot length direction. The expressions "medial side" and "lateral side" represent a positional relationship in each of the soles 1A to 1C in a foot width direction.

Configuration of Sole Series S

Figure 1:
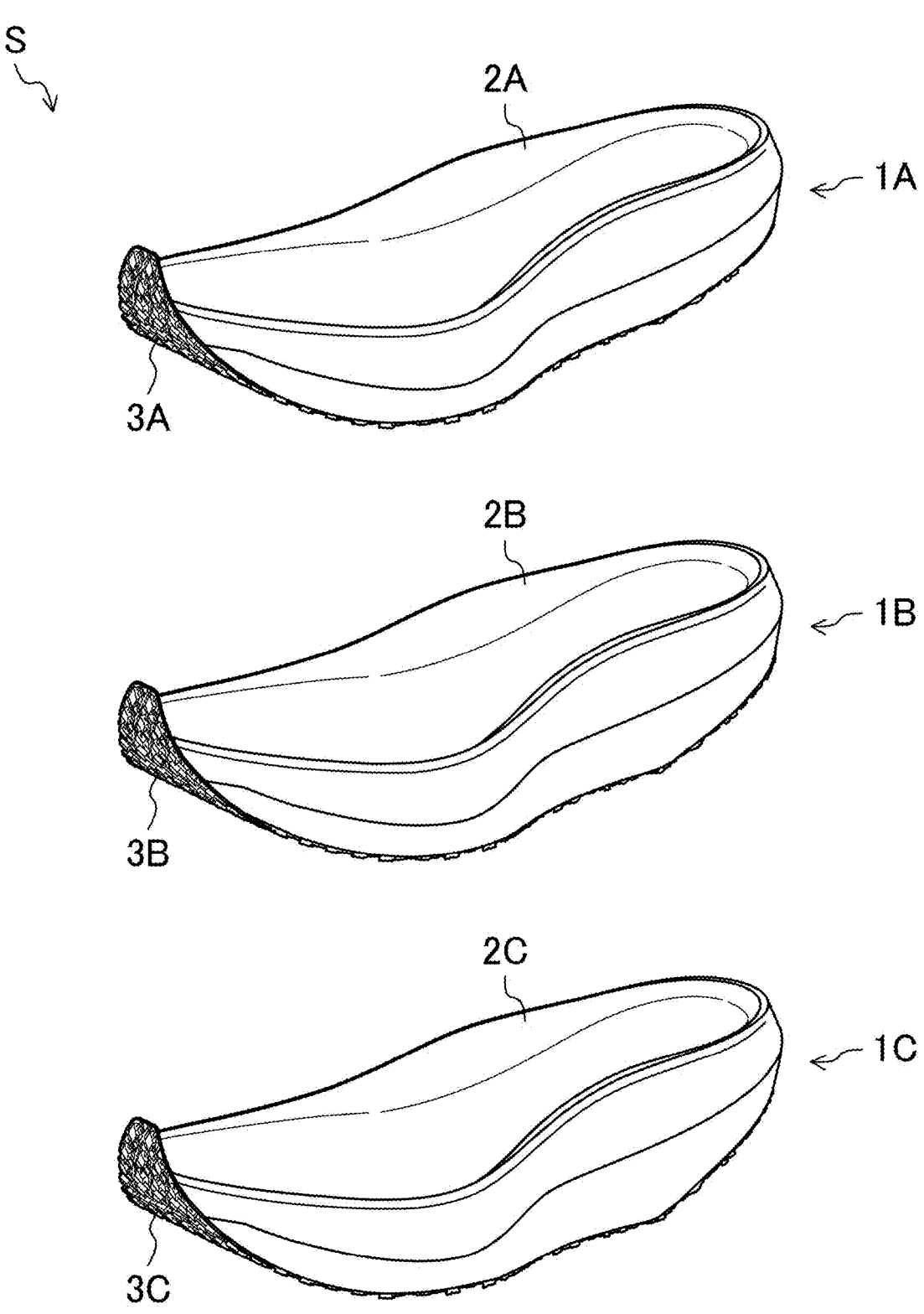
FIG. 1 is a perspective view of a sole series S according to a first embodiment.
Figure 2:
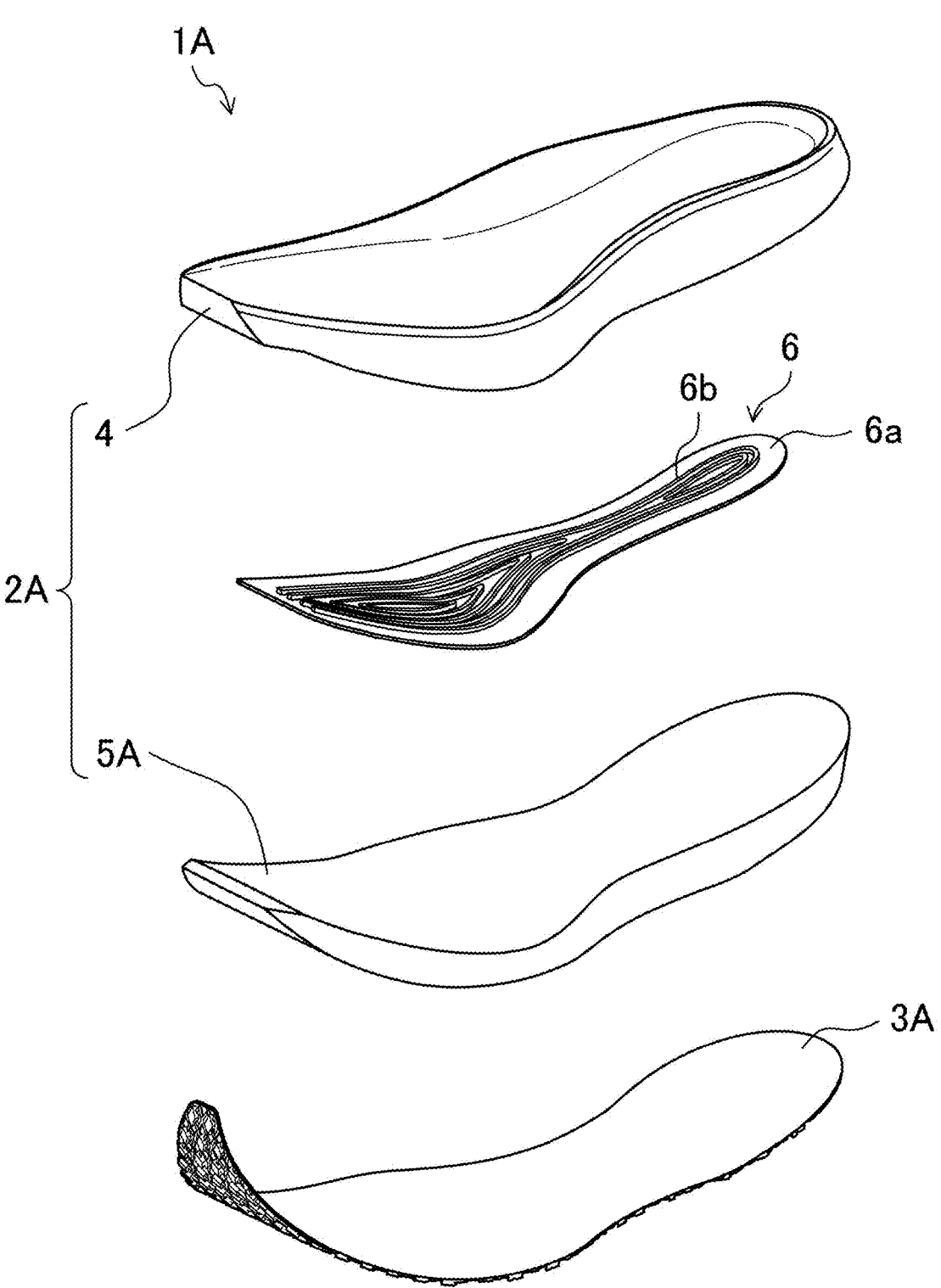
FIG. 2 is an exploded perspective view of a sole 1A of FIG. 1.
Figure 3:
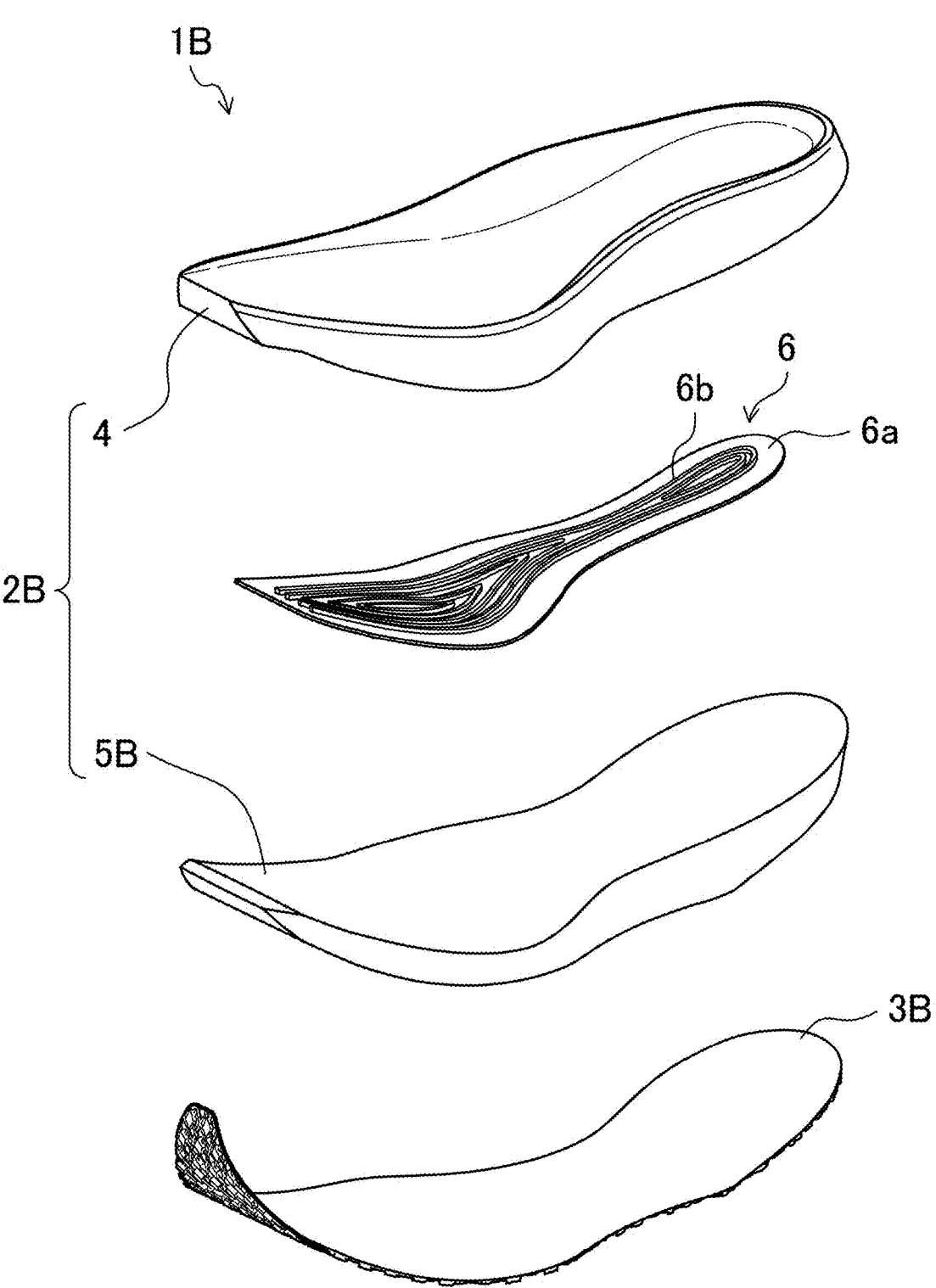
FIG. 3 is an exploded perspective view of a sole 1B of FIG. 1.
Figure 4:
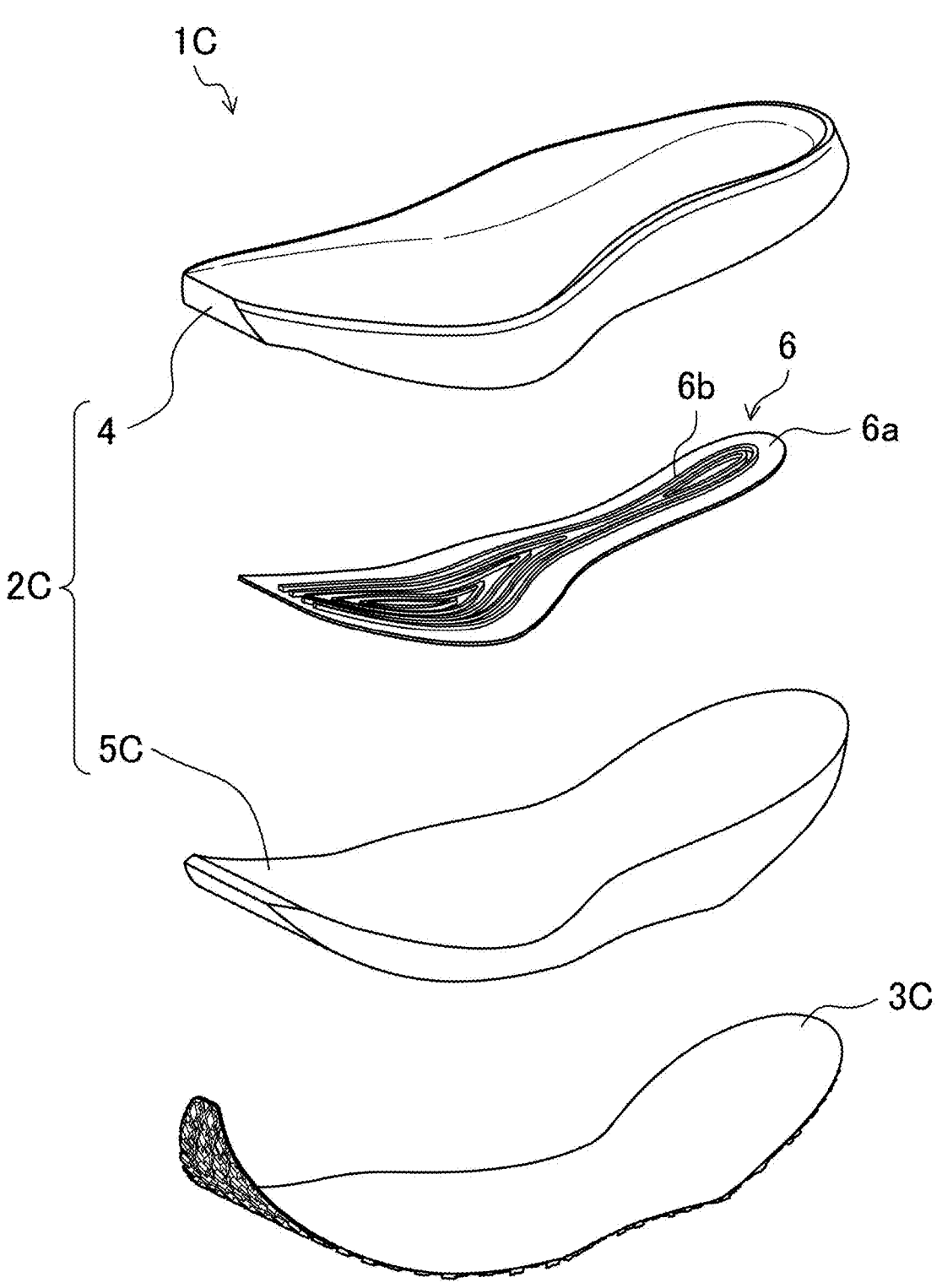
FIG. 4 is an exploded perspective view of a sole 1C of FIG. 1.

As illustrated in FIG. 1, in the first embodiment, the sole series S includes three types of soles, that is, the soles 1A to 1C, that aims to encourage a wearer to run in the forefoot running style or the midfoot running style. Although details will be described later, each of the soles 1A to 1C is configured such that an inclination angle of a sole supporting surface (upper surface) differs between the soles 1A to 1C.

Common Configuration to Soles 1A to 1C

As illustrated in FIG. 2 to FIG. 7, each of the soles 1A to 1C includes a corresponding one of midsoles 2A to 2C, a corresponding one of outsoles 3A to 3C, and a plate 6.

Each of the midsoles 2A to 2C is provided to extend from a rear end of a corresponding one of the soles 1A to 1C to a front end thereof (extending from a heel region to a toe region). The midsoles 2A to 2C are formed of a soft elastic material having a lower hardness than that of the outsoles 3A to 3C that will be described later. Specifically, as a material of the midsoles 2A to 2C, for example, thermoplastic synthetic resins, such as ethylene-vinyl acetate copolymer (EVA) or the like, foams thereof, thermosetting resins, such as polyurethane (PU) or the like, foams thereof, rubber materials, such as butadiene rubber, chloroprene rubber, or the like, foams thereof, or the like are suitable. Note that the material of the midsoles 2A to 2C is not limited to those described above.

Each of the midsoles 2A to 2C is separated into upper and lower portions. Specifically, each of the midsoles 2A to 2C includes an upper midsole 4 and a corresponding one of lower midsoles 5A to 5C that is provided under the upper midsole 4.

Each of the upper midsoles 4 is provided to extend from a rear end of a corresponding one of the soles 1A to 1C to a front end thereof in the longitudinal direction (extend from a heel region to a toe region) and extend throughout an entire range from a medial side end of the corresponding one of the soles 1A to 1C to a lateral side end thereof in the foot width direction. An upper surface of the upper midsole 4 is formed into a curved shape along a sole surface of a foot of a shoe wearer and serves as a sole supporting surface that supports the sole surface of the foot of the shoe wearer via an insole (not illustrated). The upper U is fixed to the upper surface of the upper midsole 4.

As illustrated in FIG. 5 to FIG. 7, a recessed groove 7 that stores the plate 6 that will be described later is formed in a lower surface of the upper midsole 4. The recessed groove 7 is formed by upwardly recessing a portion of the lower surface of the upper midsole 4. The recessed groove 7 is formed to be located in a position corresponding to that of the place 6 and to have size and depth corresponding to those of the plate 6 such that the lower surface of the plate 6 is flush with the lower surface of the upper midsole 4 when the plate 6 is fitted to the recessed groove 7.

Each of the lower midsoles 5A to 5C is provided to extend from a rear end of a corresponding one of the soles 1A to 1C to a front end thereof in the longitudinal direction (extend from a heel region to a toe region) and extend throughout an entire range from a medial side end of the corresponding one of the soles 1A to 1C to a lateral side end thereof in the foot width direction. An upper surface of each of the lower midsoles 5A to 5C is formed into a curved shape extending along the lower surface of the upper midsole 4 and is fixed to the lower surface of the upper midsole 4 and the lower surface of the plate 6 that will be described later via an adhesive or the like.

The upper midsole 4 and the lower midsoles 5A to 5C are formed of the same elastic material. Note that the upper midsole 4 and the lower midsoles 5A to 5C may be formed of elastic materials with different hardnesses.

Each of the outsoles 3A to 3C is provided to extend from a rear end of a corresponding one of the soles 1A to 1C to a front end thereof in the longitudinal direction (extend from a heel region to a toe region) and extend throughout an entire range from a medial side end of the corresponding one of the soles 1A to 1C to a lateral side end thereof in the foot width direction. The outsoles 3A to 3C are formed of a hard elastic material having a higher hardness than that of the midsoles 2A to 2C. Specifically, as a material of the outsoles 3A to 3C, for example, thermoplastic synthetic resin, such as ethylene-vinyl acetate copolymer (EVA) or the like, thermosetting resin, such as polyurethane (PU) or the like, and a rubber material, such as butadiene rubber, chloroprene rubber, or the like are suitable. Note that the material of the outsoles 3A to 3C is not limited to those described above.

An upper surface of each of the outsoles 3A to 3C is formed into a curved shape extending along a lower surface of a corresponding one of the lower midsoles 5A to 5C and is fixed to the lower surface of the corresponding one of the lower midsoles 5A to 5C via an adhesive or the like. A lower surface of each of the outsoles 3A to 3C serves as a ground contact surface that contacts the ground G during running.

The plate 6 is provided to extend from a rear end of a corresponding one of the soles 1A to 1C to a front end thereof in the longitudinal direction (extend from a heel region to a toe region) and extend throughout a range from a medial side end of the corresponding one of the soles 1A to 1C to a lateral side end thereof in the foot width direction. The plate 6 has a smaller length in the longitudinal direction and also a smaller length in the foot width direction with respect to the midsoles 2A to 2C and the outsoles 3A and 3C.

The plate 6 is formed of an elastic material having a higher hardness than that of the midsoles 2A to 2C so as to have a sheet-like shape. Specifically, as a material of the plate 6, for example, thermoplastic synthetic resin, such as thermoplastic polyurethane (TPU), polyamide elastomer (PAE), polyamide, or the like, and a material obtained by adding a fiber material, such as glass fiber, carbon fiber, or the like to any one of the resins described above are suitable. The plate 6 is an injection-molded product obtained by injection molding the thermoplastic synthetic resin (including the thermoplastic synthetic resin with a fiber material added thereto) described above. A bend elastic constant of the plate 6 is preferably set to, for example, 100 MPa to 400 MPa (specifically, 390 MPa).

Note that the plate 6 may be a heat-press molded product obtained by heat-press molding a thermosetting fiber reinforced plastic material and may be a heat-press molded product obtained by heat-press molding a thermoplastic fiber reinforced plastic material or a resin sheet material.

The plate 6 includes a plate-like substrate portion 6a and a plurality of ribs 6b protruding upward from an upper surface of the substrate portion 6a. The plate 6 is stored in the recessed groove 7 of the upper midsole 4 and a lower surface of the plate 6 is fixed to an upper surface of a corresponding one of the lower midsoles 5A to 5C via an adhesive or the like. With the configuration described above, the plate 6 is sandwiched between the upper midsole 4 and the corresponding one of the lower midsoles 5A to 5C.

The upper midsoles 4 of the soles 1A to 1C are formed to have the same shape. Moreover, the plates 6 of the soles 1A to 1C are formed to have the same shape. That is, in manufacturing the three types of soles 1A to 1C that constitute the sole series S, only one model is prepared for each of the upper midsole 4 and the plate 6.

Different Configuration Between Soles 1A to 1C

In the soles 1A to 1C, the lower midsoles 5A to 5C are formed to have different shapes and the outsoles 3A to 3C are formed to have different shapes. Specifically, while the upper midsoles 4 having the same shape are used for the three types of soles 1A to 1C, the lower midsoles 5A to 5C formed to have different shapes such that the inclination angle of the sole supporting surface (the upper surface of each of the soles 1A to 1C) differs between the three types of soles 1A to 1C are used. Each of the outsoles 3A to 3C is formed to have a shape extending along a corresponding one of the lower surfaces of the lower midsoles 5A to 5C that have different shapes, so that the outsoles 3A to 3C have different shapes. Note that, although the entire shapes of the lower midsoles 5A to 5C differ between the soles 1A to 1C, the upper surfaces of the lower midsoles 5A to 5C abut on the lower surfaces of the upper midsoles 4 having the same shape, and therefore, the upper surfaces of the lower midsoles 5A to 5C have the same shape.

Design Intent for Lower Midsoles 5A to 5C

Differences between the shapes of the lower midsoles 5A to 5C (design intent) will be described in detail below. Note that, as illustrated in FIG. 5 to FIG. 7, each portion of each of the soles 1A to 1C is defined as follows.

P1: A position of a rearmost end on a sole supporting surface

P100: A position of a foremost end on the sole supporting surface

Ls: A straight line connecting a position P0 and the position P100

Lc: A curved line connecting the position P0 and the position P100 and extending along the sole supporting surface L: A length of a curved line Lc P15: A position at a distance (path length) of 0.15 L from the position P0 on the curved line Lc P45: A position at a distance (path length) of 0.45 L from the position P0 on the curved line Lc P68: A position at a distance (path length) of 0.68 L from the position P0 on the curved line Lc P45': An intersection of a straight line orthogonal to the straight line Ls passing through the position P45 and a lower surface of an upper midsole P68': An intersection of a straight line orthogonal to the straight line Ls passing through the position P68 and the lower surface of the upper midsole C: An intersection of the straight line orthogonal to the straight line Ls passing through the position P45 and a lower surface of a sole T: A straight line connecting the position 15 and the position P68

T': A straight line connecting the position P45' and the position P68'

In the sole series S, the lower midsoles 5A to 5C are configured such that, when the shoes SA to SC are not worn, while each of all of the soles 1A to 1C contacts the ground G at the intersection C (a position corresponding to a plantar arch of the foot of the wearer), the heel region thereof does not contact the ground and an angle α (the inclination angle α of the sole supporting surface) between a straight line T and the ground G in each of the soles 1A to 1C is a forwardly descending angle. With the configuration described above, each of the soles 1A and 1C that constitute the sole series S is formed such that, when impacting the ground, while it is difficult for the heel region thereof to contact the ground, the forefoot or the midfoot easily contacts the ground. Accordingly, each of the soles 1A to 1C of the sole series S can encourage the wearer to perform running in the forefoot running style or the midfoot running style.

In the sole series S, the three types of soles 1A to 1C configured such that the inclination angle α of the sole supporting surface (upper surface) differs between the soles 1A to 1C are prepared (designed) so that it can be encourage various people to perform running in the forefoot running style or the midfoot running style without feeling uncomfortable, although an angle of the foot when impacting the ground differs from person to person even in running in the same forefoot running style.

Therefore, the lower midsoles 5A to 5C used in the three types of soles 1A to 1C, respectively, are formed to have different shapes such that the angle α between the straight line T and the ground G (the inclination angle α of the sole supporting surface) is a forwardly descending angle that differs between the sole 1A to 1C.

Specifically, the angle α between the straight line T and the ground G (the inclination angle α of the sole supporting surface) is an angle equal or larger than 5 degrees and equal to or smaller than 16 degrees. In the first embodiment, the lower midsoles 5A to 5C are designed such that the angle α of the sole 1A is 5 degrees, the angle α of the sole 1B is 8 degrees, and the angle α of the sole 1C is 11 degrees. Note that, when the angle α between the straight line T and the ground G (the inclination angle α of the sole supporting surface) is smaller than 5 degrees, deviation from the angle of the foot of the wearer who performs running in the forefoot running style is large, and there arises a concern that the foot of the wearer who performs running in the forefoot running style cannot be stably supported. When the angle α between the straight line T and the ground G (the inclination angle α of the sole supporting surface) is larger than 16 degrees, the foot of the wearer is made inclined forward too much, and therefore, there is a probability that a posture of the wearer is inclined forward too much, the wearer cannot strongly kick the ground G, and the wearer cannot efficiently run fast. Therefore, the angle α between the straight line T and the ground G (the inclination angle α of the sole supporting surface) is an angle equal to or larger than 5 degrees and equal to or smaller than 16 degrees.

In the first embodiment, the lower midsoles 5A to 5C are configured such that, when the shoes SA to SC are not worn, an angle α' between a straight line T' and the ground G (an angle α' of a boundary surface between the upper midsole 4 and a corresponding one of the lower midsoles 5A to 5C in a midfoot region) is a forwardly descending angle. With the configuration described above, each of the three types of soles 1A to 1C that constitute the sole series S encourages shifting of center of gravity of the wearer after contacting the ground, such that the wearer can smoothly shift the center of gravity forward when stepping.

Furthermore, in the sole series S of the first embodiment, since the angle of the foot when stepping after contacting the ground differs from person to person, similar to that when contacting the ground, the lower midsoles 5A to 5C are formed (designed) such that the angle α' of the boundary surface between the upper midsole 4 and the corresponding one of the lower midsoles 5A to 5C in the midfoot region is a forwardly descending angle that differs between the three different types of sole 1A to 1C, in order to encourage various people to shift the center of gravity forward without feeling uncomfortable.

Specifically, the lower midsoles 5A to 5C are designed such that the angle α' between the straight line T' and the ground G (the angle α' of the boundary surface between the upper midsole 4 and the corresponding one of the lower midsoles 5A to 5C in the midfoot region) is an angle larger than 0 degrees and equal to or smaller than 45 degrees. Note that, when the angle α' between the straight lint T' and the ground G is 0 degrees or less (horizontal or a forwardly descending angle), there is a probability that, after contacting the ground, the wearer cannot smoothly shift the center of gravity when stepping and has difficulty to move forward. When the angle α' between the straight line T' and the ground G is larger than 45 degrees, there is a probability that, after contacting the ground, the wearer feels an increasing pushing-up feeing of the plate 6 at the foot when stepping and thus has a pain at the foot. Therefore, the angle α' between the straight line T' and the ground G (the angle α' of the boundary surface between the upper midsole 4 and the corresponding one of the lower midsoles 5A to 5C in the midfoot region) is an angle larger than 0 degrees and equal to or smaller than 45 degrees.

(Relationship Between Angle of Sole Supporting Surface and Angle of Foot of Wearer)

As described above, in the sole series S, for the three types of soles 1A to 1C, the upper midsole 4 that is common for the soles 1A to 1C is employed and the lower midsoles 5A to 5C having different shapes are employed, so that the three types of soles 1A to 1C configured such that the angle α (the angle α between the straight line T and the ground G) of the sole supporting surface differs between the soles 1A to 1C can be provided.

Figure 8:
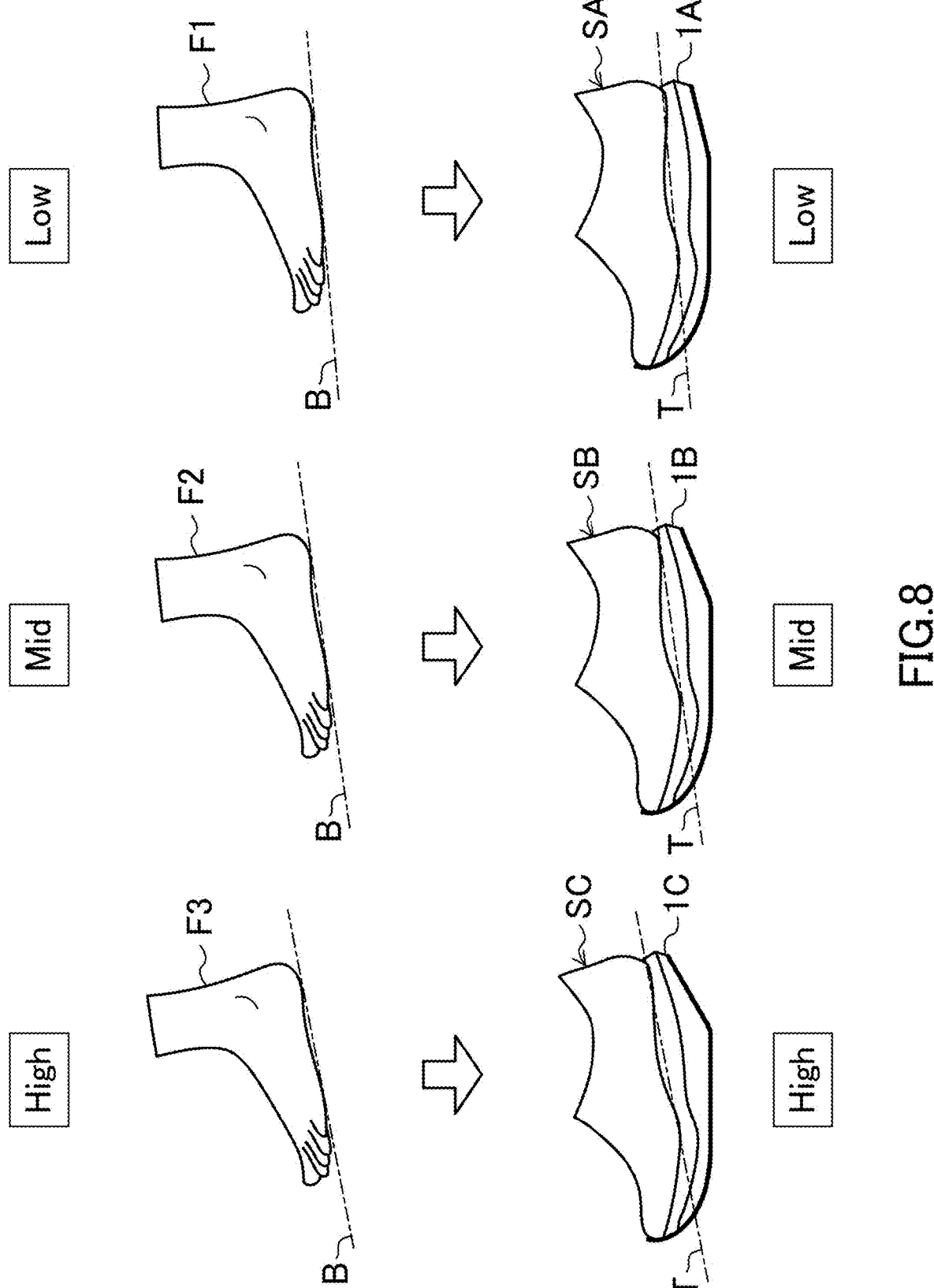
FIG. 8 is a view illustrating a relationship between an inclination angle of a sole supporting surface and an angle of a foot.

According to the sole series S described above, as illustrated in FIG. 8, for a person of a Low type who has a foot F1 an angle of which (angle between a sole surface B and the ground G) is small when contacting the ground, the shoe SA of the Low type in which the angle α (the angle α between the straight line T and the ground G) of the sole supporting surface is small is most suitable, and when the person selects the shoe SA, the person is encouraged to efficiently run fast in the forefoot running style or the midfoot running style by the sole 1A. Even when the person of the Low type selects the shoe SB of a Mid type in which the angle α of the sole supporting surface is medium, the person is encouraged to efficiently run fast in the forefoot running style or the midfoot running style by the sole 1B, but the effect thereof is less than that of the shoe SA. This is because there is a probability that an action during running becomes unnatural since the angle α of the sole supporting surface of the sole 1B is slightly larger than the angle of the foot F1 of the person of the Low type. It is not suitable for the person of the Low type to select the shoe SC of a High type in which the angle α of the sole supporting surface is large. This is because there is a probability that a deviation from a usual running action is large and a significantly uncomfortable feeling is given to the wearer during running, since the angle α of the sole supporting surface of the sole 1C is much larger than the angle of the angle of the foot F1 of the person of the Low type.

For a person of the Mid type who has a foot F2 an angle of which is medium when contacting the ground, the shoe SB of the Mid type in which the angle α of the sole supporting surface is medium is most suitable, and when the person selects the shoe SB, the person is encouraged to efficiently run fast in the forefoot running style of the midfoot running style by the sole 1B. Even when the person of the Mid type selects the shoe SA of the Low type in which the angle α of the sole supporting surface is small or the shoe SC of the High type in which the angle α of the sole supporting surface is large, the person is encouraged to efficiently run fast in the forefoot running style or the midfoot running style by the sole 1A or the sole 1C, but the effect thereof is less than that of the shoe SB. This is because there is a probability that an action during running becomes unnatural since the angle α of the sole supporting surface of the sole 1A or the sole 1C is smaller or larger than the angle of the foot F2 of the person of the Mid type.

For a person of the High type who has a foot F3 an angle of which is large when contacting the ground, the shoe SC of the High type in which the angle α of the sole supporting surface is large is most suitable, and when the person selects the shoe SC, the person is encouraged to efficiently run fast in the forefoot running style or the midfoot running style by the sole 1C. Even when the person of the High type selects the shoe SB of the Mid type in which the angle $\alpha$ of the sole supporting surface is medium, the person is encouraged to efficiently run fast in the forefoot running style or the midfoot running style by the sole 1B, but the effect thereof is less than that of the shoe SC. This is because a time during which the foot F3 is not supported by the sole 1B occurs when stepping after contacting the ground since the angle $\alpha$ of the sole supporting surface of the sole 1B is slightly smaller than the angle of the foot F3 of the person of the High type. It is not suitable for the person of the High type to select the shoe SA of the Low type in which the angle $\alpha$ of the sole supporting surface is small. This is because running in the forefoot running style or the midfoot running style cannot be encouraged at all by the sole 1A since the angle $\alpha$ of the sole supporting surface of the sole 1A is much smaller than the angle of the foot F3 of the person of the High type.

—Method for Manufacturing Soles 1A to 1C—Next, a method for manufacturing the soles 1A to 1C that constitute the sole series S will be described.

First, components of the soles 1A to 1C are formed (a component forming step). Specifically, one type of midsole, that is, the upper midsole 4, is formed using one type of mold, three types of midsoles, that is, the lower midsoles 5A to 5C, are formed using three types of molds, three types of outsoles, that is, the outsoles 3A to 3C, are formed using three types of molds, and one type of plate, that is, the plate 6, is formed using one type of mold.

Next, a component corresponding to a target to be manufactured is selected (a selecting step). Specifically, in manufacturing the sole 1A, the lower midsole 5A is selected from the three types of lower midsoles 5A to 5C, and the outsole 3A is selected from the three types of outsoles 3A to 3C. In manufacturing the sole 1B, the lower midsole 5B is selected from the three types of lower midsoles 5A to 5C, and the outsole 3B is selected from the three types of outsoles 3A to 3C. In manufacturing the sole 1C, the lower midsole 5C is selected from the three types of lower midsoles 5A to 5C, and the outsole 3C is selected from the three types of outsoles 3A to 3C.

Then, the soles 1A to 1C are assembled by stacking components corresponding to the target to be manufactured in the vertical direction and fixing them to each other by an adhesive or the like (an assembling step). Specifically, the upper midsole 4, the plate 6, the lower midsole 5A, and the outsole 3A are stacked in this order in a downward direction from above and are fixed to each other by the adhesive or the like, and thus, the sole 1A is assembled. The upper midsole 4, the plate 6, the lower midsole 5B, and the outsole 3B are stacked in this order in the downward direction from above and are fixed to each other by the adhesive or the like, and thus, the sole 1B is assembled. Furthermore, the upper midsole 4, the plate 6, the lower midsole 5C, and the outsole 3C are stacked in this order in the downward direction from above and are fixed to each other by the adhesive or the like, and thus, the sole 1 C is assembled. As has been described above, the soles 1A to 1C that constitute the sole series S are manufactured by performing the component forming step, the selecting step, and the assembling step.

Effect of First Embodiment

As has been described above, the sole series S of the first embodiment includes the plurality of types of soles 1A to 1C (in the first embodiment, three types), each of the plurality of types of soles 1A to 1C is configured such that, in a non-wearing state, while all of the soles 1A to 1C contact the ground G at the intersection C (the position corresponding to the plantar arch of the foot of the wearer), the heel region thereof does not contact the ground, and furthermore, the inclination angle $\alpha$ of the sole supporting surface (the angle $\alpha$ between the straight line T and the ground G) in each of the soles 1A to 1C is a forwardly descending angle. With the configuration described above, each of the plurality of types of soles 1A and 1C that constitute the sole series S is formed such that the heel region thereof is less likely to contact the ground when impacting the ground and, on the other hand, the forefoot or the midfoot easily contacts the ground. That is, according to the sole series S of the first embodiment, the plurality of types of soles 1A to 1C that each can encourage a wearer thereof to perform running in the forefoot running style or the midsole running style can be provided.

In the first embodiment, the midsoles 2A to 2C are formed such that each of the midsoles 2A to 2C has an upper and lower double layer structure and, while the upper midsoles 4 having the same shape are used (only one model is prepared) for the plurality of types of soles 1A to 1C, the lower midsoles 5A to 5C having different shapes are used (a plurality of models are prepared) for the plurality of types of soles 1A to 1C. Thus, the plurality of types of soles 1A to 1C configured such that the inclination angle $\alpha$ of the sole supporting surface (the angle $\alpha$ between the straight line T and the ground) differs between the plurality of types of soles 1A to 1C can be provided. According to the configuration described above, in manufacturing the plurality of types of soles 1A to 1C, the number of types of molds that are to be prepared for forming the midsoles 2A to 2C can be reduced (reduced from six types including three types for each of upper and lower ones to four types). Therefore, according to the first embodiment, in manufacturing the sole series S including the plurality of types of soles 1A to 1C that can encourage wearers to perform running in the forefoot running style or the midfoot running style, an initial investment cost can be reduced.

In the first embodiment, each of the plurality of types of soles 1A to 1C is configured such that, in a non-wearing state, the angle $\alpha'$ of the midfoot region of the boundary surface between the upper midsole 4 and a corresponding one of the lower midsoles 5A to 5C (the angle $\alpha'$ between the straight line T' and the ground G) is a forwardly descending angle. With the configuration described above, each of the plurality of types of soles 1A and 1C that constitute the sole series S is formed to encourage shifting of the center of gravity forward after contacting the ground. That is, according to the sole series S of the first embodiment, the plurality of types of soles 1A to 1C that each can cause the wearer to smoothly perform running in the forefoot running style or the midsole running style can be provided.

In the first embodiment, the plurality of types of soles 1A to 1C configured such that the angle $\alpha'$ (the angle $\alpha'$ between the straight line T' and the ground G) of the boundary surface between the upper midsole 4 and a corresponding one of the lower midsoles 5A and 5C in the midfoot region differs between the soles 1A to 1C are provided by making the shapes of the lower midsoles 5A to 5C different between the plurality of types of soles 1A to 1C. With the configuration described above, the soles 1A to 1C of many variations with different feelings when stepping after contacting the ground can be provided.

In the first embodiment, the upper midsoles 4 having the same shape are used for the different types of soles 1A to 1C, so that the plates 6 having the same shape can be used. Thus, in manufacturing the plurality of types of soles 1A to 1C, the number of types of molds that are to be prepared for forming the plates 6 can be reduced (reduced from three types to one type). Therefore, according to the first embodiment, in manufacturing the sole series S including the plurality of type of soles 1A to 1C that each can encourage the wearers to perform running in the forefoot running style or the midfoot running style, the initial investment cost can be further reduced.

In the first embodiment, the method for manufacturing the soles 1A to 1C that constitute the sole series S includes a selecting step of selecting one lower midsole from the plurality of lower midsoles 5A to 5C with different shapes. Although, in the selecting step, one of the lower midsoles 1A to 1C that is used for manufacturing a corresponding one of the soles 1A to 1C is selected, there is no need to select one from the upper midsoles 4 since the upper midsoles 4 having the same shape are used for the soles 1A to 1C, and there is no need to prepare a plurality of types molds in order to manufacture a plurality of types of upper midsoles 4. Therefore, according to the method for manufacturing the soles 1A to 1C according to the first embodiment, in manufacturing the sole series S including the plurality of types of soles 1A to 1C, the initial investment cost can be reduced.

Second Embodiment

A sole series S according to a second embodiment includes the soles 1A to 1C that constitute the sole series S of the first embodiment and soles 1D to 1F that are one size larger than the soles 1A to 1C. The soles 1A to 1C in the second embodiment are configured in a similar manner to that in the first embodiment, and therefore, description thereof will be omitted.

Each of the soles 1D to 1F includes a corresponding one of midsoles 2D to 2F, a corresponding one of outsoles 3D to 3F, and a plate 6. Each of the midsoles 2D to 2F includes an upper midsole 4 and a corresponding one of lower midsoles 5D to 5F that is provided under the upper midsole 4.

Figure 9:
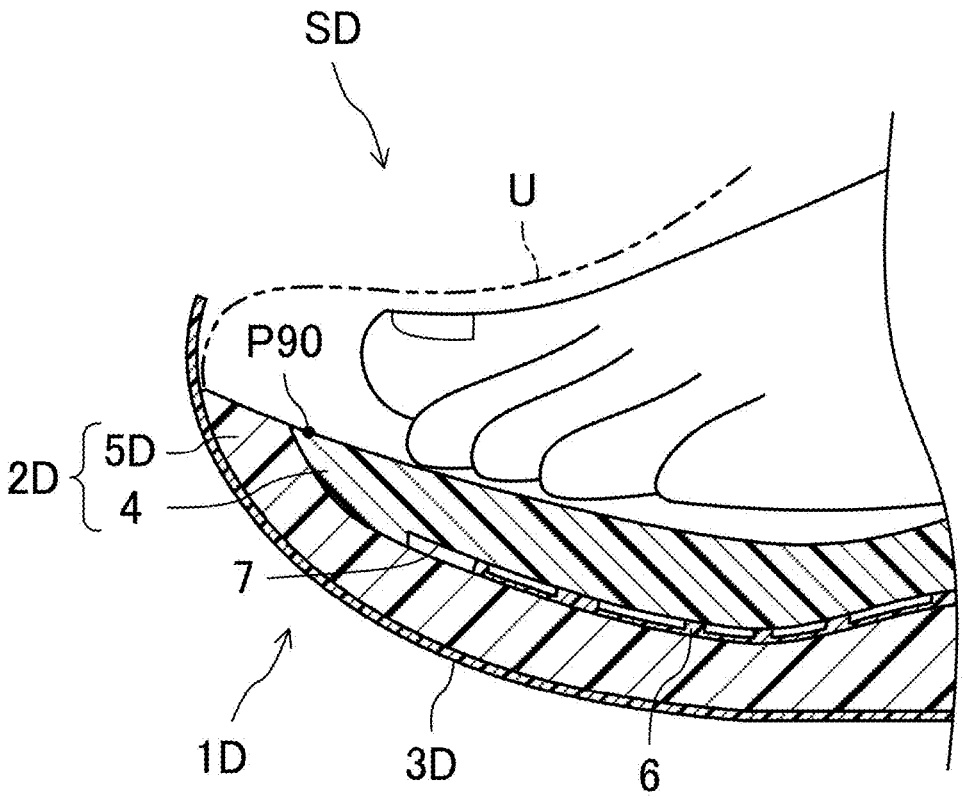
FIG. 9 is a partial enlarged cross-sectional view of a forefoot region of a sole 1D of a sole series S according to a second embodiment when viewed from the lateral side.

As illustrated in FIG. 9, the sole 1D is configured substantially similar to the sole 1A, except that the lower midsole 5D is formed longer than the lower midsole 5A of the sole 1A in the longitudinal direction. The sole 1E is configured substantially similar to the sole 1B, except that the lower midsole 5E is formed longer than the lower midsole 5B of the sole 1B in the longitudinal direction. The sole 1F is configured substantially similar to the sole 1C, except that the lower midsole 5F is formed longer than the lower midsole 5C of the sole 1C in the longitudinal direction. That is, the soles 1D to 1F are used for shoes SD to SF that are one size larger than the shoes SA to SC.

As illustrated in FIG. 9, the lower midsole 5D of the sole 1D is configured such that a front end thereof is disposed more forward than a front end of the upper midsole 4 and is formed into a long lower midsole that is longer than the lower midsole 5A of the sole 1A. An upper surface of a front end portion of the lower midsole 5D disposed more forward than the front end of the upper midsole 4 forms a front end portion of a sole supporting surface of the sole 1D. That is, in the sole 1D, an upper surface of the upper midsole 4 and the upper surface of the front end portion of the lower midsole 5D form the sole supporting surface.

The lower midsole 5D of the sole 1D is also configured such that, when a position at a distance (path length) of 0.90 L from the position P0 on the curved line Lc is P90, the position P90 is on the upper surface of the upper midsole 4.

That is, in the sole 1D, the long lower midsole 5D is configured such that, on the sole supporting surface (upper surface), a boundary between the upper midsole 4 and the long lower midsole 5D is located more forward than the position P90.

Similar to the long lower midsole 5D of the sole 1D, each of the lower midsoles 5E and 5F of the soles 1E and 1F is configured such that a front end thereof is disposed more forward than the front end of the upper midsole 4 and is formed into a long lower midsole that is logger than a corresponding one of the lower midsoles 5B and 5C of the soles 1B and 1C. An upper surface of a front end portion of each of the lower midsoles 5E and 5F disposed more forward than the front end of the upper midsole 4 forms a front end portion of a corresponding one of sole supporting surfaces of the soles 1E and 1F. That is, in each of the soles 1E and 1F, an upper surface of the upper midsole 4 and the upper surface of the front end portion of a corresponding one of the lower midsoles 5E and 5F form the sole supporting surface.

Similar to the lower midsole 5D of the sole 1D, each of the lower midsoles 5E and 5F of the soles 1E and 1F is also configured such that the position P90 is on the upper surface of the upper midsole 4. That is, in each of the soles 1E and 1F, a corresponding one of the long lower midsoles 5E and 5F is configured such that, on the sole supporting surface (upper surface), a boundary between the upper midsole 4 and the corresponding one of the long lower midsoles 5E and 5F is located more forward than the position P90.

As described above, the soles 1D to 1F are configured similar to the soles 1A to 1C, except that each of the lower midsoles 5D and 5E is formed into a long lower midsole that is longer than a corresponding one of the lower midsoles 5A to 5C of the soles 1A to 1C. Therefore, description of other detailed configurations will be omitted.

As has been described above, according to the second embodiment, at least one (in the second embodiment, three, that is, the lower midsoles 5D to 5F) of the lower midsoles 5A to 5F of the plurality of types (six types) of soles 1A to 1F is formed into a long lower midsole a front end of which is disposed more forward than the front end of the upper midsole 4. According to the configuration described above, while the upper midsoles 4 that have the same shape are used, as the lower midsoles 5A to 5F, the lower midsoles configured such that the front end thereof is not disposed more forward than the front end of the upper midsole 4 (the lower midsoles 5A to 5C) and the long lower midsole (the lower midsoles 5D to 5F) are used, so that soles of different sizes (the soles 1A to 1C and the soles 1D to 1F) can be provided. That is, in the second embodiment, while the upper midsoles 4 that have the same shape are used, the lower midsoles 5A to 5F of different types are used, so that the soles 1A to 1F configured such that not only the inclination angle $\alpha$ of the sole supporting surface (the angle $\alpha$ between the straight line T and the ground) differs between the soles 1A to 1F but also the size differs between the soles 1A to 1F can be provided. Therefore, according to the second embodiment, in manufacturing the sole series S including the plurality of types of soles 1A to 1F that can encourage wearers to perform running in the forefoot running style or the midfoot running style, the initial investment cost can be further reduced.

In the second embodiment, the lower midsoles 5D to 5F (long lower midsole) are configured such that, on the sole supporting surface (upper surface) of each of the soles 1D to 1F, the boundary between the upper midsole 4 and a corresponding one of the lower midsoles 5D to 5F (long lower midsole) is located more forward than the position P90. Normally, a foot of a wearer is placed on a region located in a rear side from the position P90 on the sole supporting surface of the corresponding sole, and the foot of the wearer is not placed in a region from the position P90 to a foremost position 100 on the sole supporting surface. Therefore, by configuring the soles in the manner described above, the foot of the wearer is not placed on the boundary between the upper midsole 4 and a corresponding one of the lower midsoles 5D to 5F (long lower midsole) and the wearer does not have an uncomfortable feeling in a wearing state.

Other Embodiments

In the first and second embodiments, each of the soles (the soles 1A to 1C or the soles 1A to 1F) that constitute the sole series S includes the plate 6. However, each of the soles (the soles 1A to 1C or the soles 1A to 1F) that constitute the sole series S may not include the plate 6.

In the first and second embodiments, the respective plates 6 of the soles (the soles 1A to 1C or the soles 1A to 1F) that constitute the sole series S all have the same shape, but variations may be given to the shapes of the plates 6.

In the first embodiment, the sole series S includes the three types of soles 1A to 1C configured such that the inclination angle α of the sole support surface differs between the soles 1A to 1C and, in the second embodiment, the sole series S includes the soles 1A to 1F of six types in total with three different inclination angles α of the sole supporting surface (three types) and two different sizes (two types). However, the number of types of soles that constitute the sole series S is not limited to the numbers described above. The sole series S may include soles with four or more different inclination angles α of the sole supporting surface (four or more types) and/or three or more sizes (three or more types).

INDUSTRIAL APPLICABILITY

As has been described above, the present disclosure is useful for a sole series and a method for manufacturing a sole.

DESCRIPTION OF REFERENCE CHARACTERS

S Sole Series
1A to 1F Sole
2A to 2F Midsole
3A to 3F Outsole
4 Upper Midsole
5A to 5F Lower Midsole
6 Plate

What is claimed is:
1. A sole series comprising:
a plurality of soles having different shapes each including a midsole that extends from a heel region to a toe region and has an upper surface that serves as a sole supporting surface that supports a sole of a foot of a shoe wearer,
wherein
each of the midsoles of the plurality of soles includes
an upper midsole that extends from the heel region to the toe region and is formed of an elastic material,
a lower midsole having an upper surface that extends along a lower surface of the upper midsole, extends from the heel region to the toe region, and is formed of an elastic material, and in each of the soles,
when a position of a rearmost end on the sole supporting surface is P0,
a position of a foremost end on the sole supporting surface is P100,
a straight line connecting the position P0 and the position P100 is Ls,
a curved line connecting the position P0 and the position P100 and extending along the sole supporting surface is Lc,
a length of a curved line Lc is L,
a position at a distance of 0.15 L from the position P0 on the curved line Lc is P15,
a position at a distance of 0.45 L from the position P0 on the curved line Lc is P45,
a position at a distance of 0.68 L from the position P0 on the curved line Lc is P68,
an intersection of a straight line passing through the position P45 and being orthogonal to the straight line Ls and a lower surface is C, and
a straight line connecting the position 15 and the position P68 is T,
each of the plurality of soles is configured such that, in a non-wearing state, while the sole contacts ground at the intersection C, the heel region does not contact the ground,
the upper midsoles of the plurality of soles are formed to have the same shape, and
the lower midsoles of the plurality of soles are formed to have different shapes such that an angle between the straight line T and the ground is a forwardly descending angle that differs between the plurality of soles.
2. The sole series of claim 1, wherein
in each of the soles,
when an intersection of the straight line passing through the position P45 and being orthogonal to the straight line Ls and the lower surface of the upper midsole is P45',
an intersection of a straight line passing through the position P68 and being orthogonal to the straight line Ls and the lower surface of the upper midsole is P68', and
a straight line connecting the position P45' and the position P68' is T', the lower midsoles of the plurality of soles are formed such that an angle between the straight line T' and the ground is a forwardly descending angle that differs between the plurality of soles.
3. The sole series of claim 1, wherein
at least one of the lower midsoles of the plurality of soles is a long lower midsole configured such that a front end thereof is disposed more forward than a front end of the upper midsole and an upper surface of a front end portion disposed more forward than the front end of the upper midsole forms a front end portion of the sole supporting surface.
4. The sole series of claim 3, wherein
the long lower midsole is configured such that
when a position at a distance of 0.90 L from the position P0 on the curved line Lc is P90, the position P90 is located on the upper surface of the upper midsole.
5. The sole series of claim 2, wherein
each of the plurality of soles includes a plate that is provided between the upper midsole and the lower midsole and is formed of an elastic material having a higher hardness than that of the upper midsole, and the plates of the plurality of soles are formed to have the
identical shape.

\* \* \* \* \*